Nov. 19, 1963  W. J. VOSS  3,110,948
CLAMP AND METHOD OF MANUFACTURE
Filed May 31, 1960  2 Sheets-Sheet 2
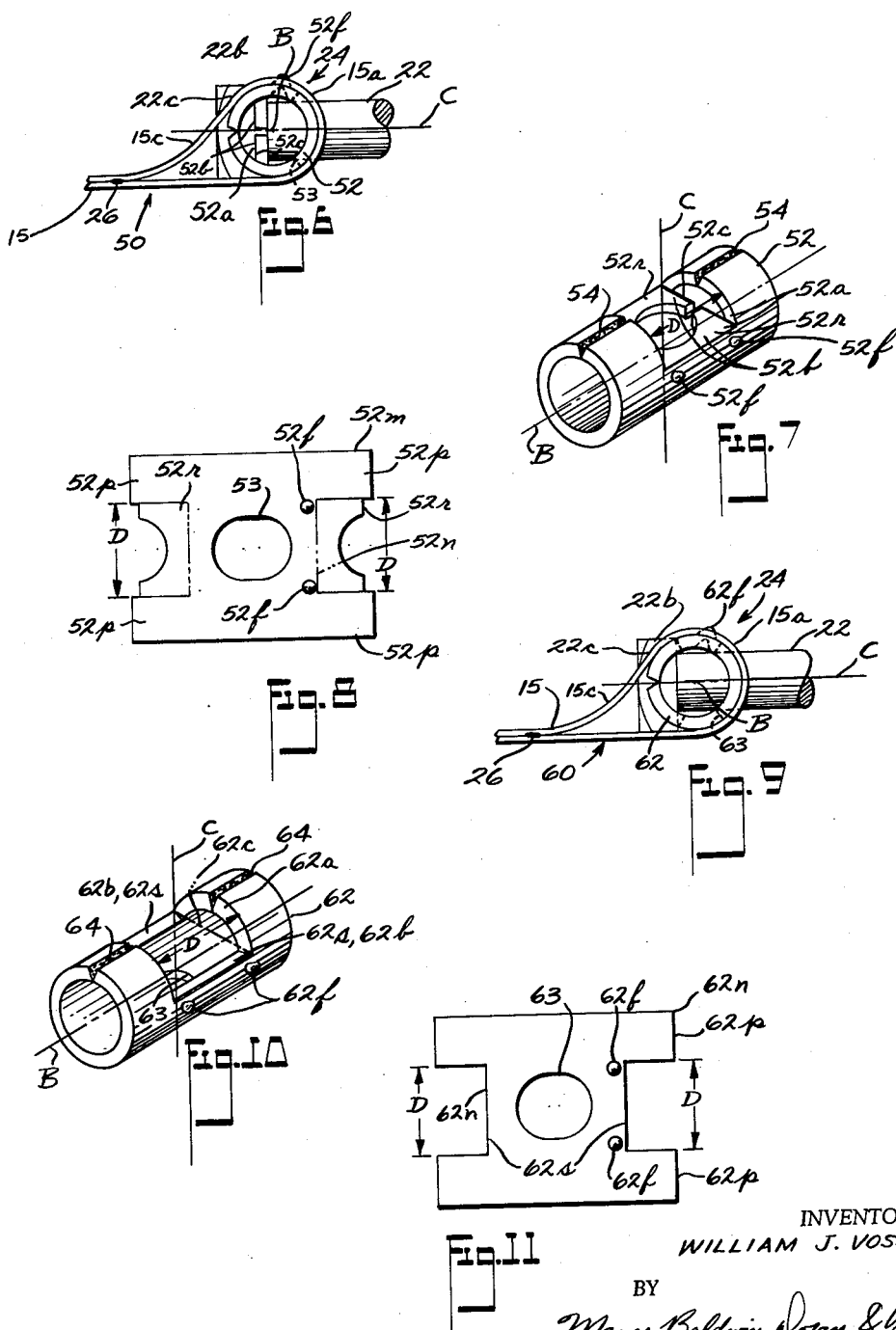
INVENTOR.
WILLIAM J. VOSS
BY
Meyer, Baldwin, Doran & Young
ATTORNEYS United States Patent Office 3,110,948
Patented Nov. 19, 1963

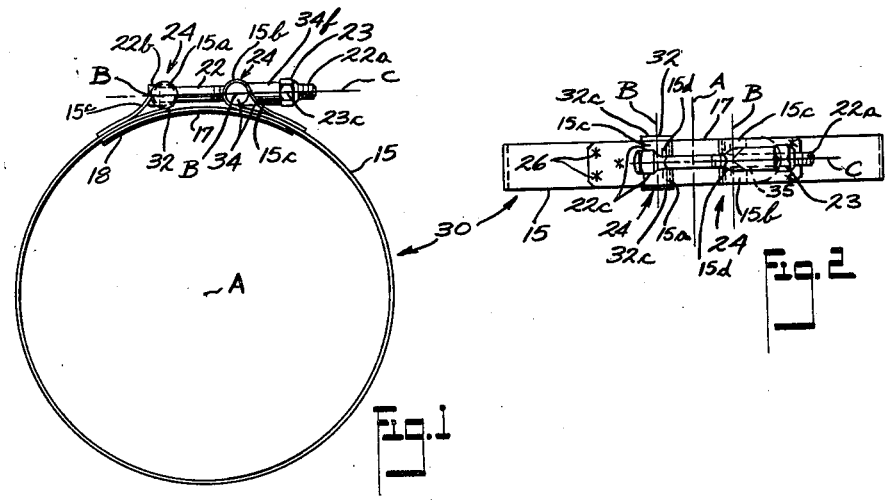
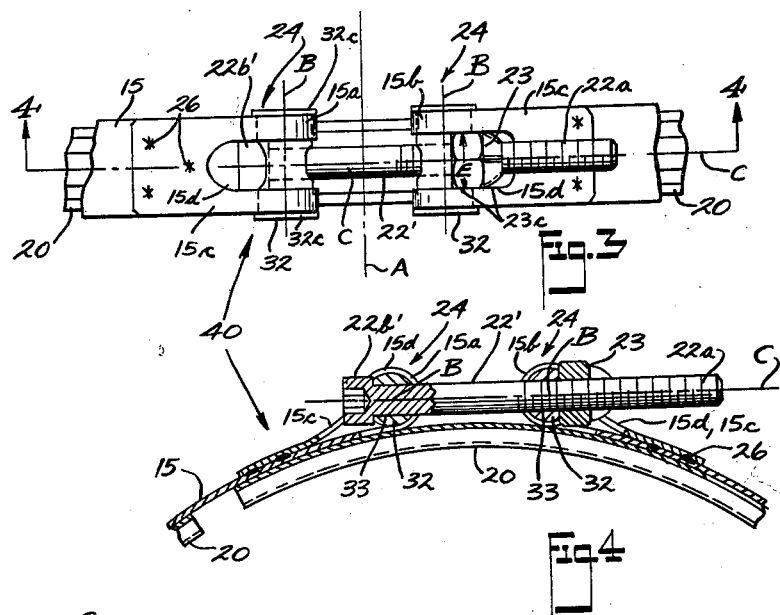
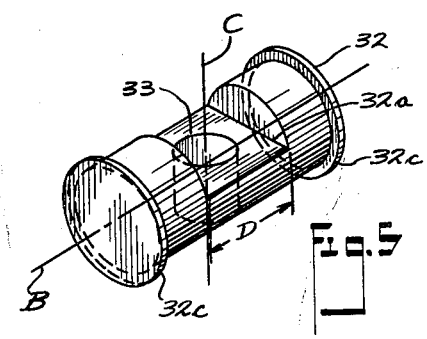

3,110,948
CLAMP AND METHOD OF MANUFACTURE
William J. Voss, 1369 Bunts Road, Lakewood, Ohio
Filed May 31, 1960, Ser. No. 32,792
1 Claim. (Cl. 24—279)

This invention relates to improvements in a clamp and its method of manufacture and more particularly to a tightening means on a band clamp.

An object of the present invention is to provide a screw type clamp tightening mechanism having an element carried by said screw locked against rotation relative to a trunnion on said clamp.

Another object of the present invention is to provide a trunnion for a clamp, or the method of manufacturing this trunnion, wherein said trunnion has a slot for preventing rotation of a nut element or bolt head element relative to said trunnion.

Another object of the present invention is to provide a trunnion for a clamp wherein said trunnion is machined from a solid bar, stamped and formed from sheet material, or manufactured in any other suitable manner.

A further object of the present invention is to provide a clamp characterized by its inexpensive manufacturing cost, ease of assembly of its component parts, structural simplicity, strong and sturdy nature, few component parts, ease of operation or use, and/or multiplicity of functional advantages for some of its component parts.

Other features of this invention reside in the arrangement and design of the parts for carrying out their appropriate functions.

Other objects and advantages of this invention will be apparent from the accompanying drawings and description and the essential features will be set forth in the appended claim.

In the drawings,

FIG. 1 is a side elevational view of a first form of clamp having trunnions;

FIG. 2 is a top plan view of the upper portion of the clamp in FIG. 1;

FIG. 3 is a top plan view, similar to FIG. 2, but of a second form of clamp having a different combination of trunnions;

FIG. 4 is a vertical sectional view taken generally along the line 4—4 of FIG. 3;

FIG. 5 is a perspective view of a trunnion forming one of the trunnions in FIG. 2 and each of the trunnions in FIG. 3;

FIG. 6 is a side elevational view, similar to the upper left portion of FIG. 1, of a portion of a third form of clamp formed when its trunnion is substituted in the clamp band in FIG. 2 or 4 for at least one of the trunnions shown in FIG. 5;

FIG. 7 is a perspective view of the trunnion in FIG. 6;

FIG. 8 is a developed view of the blank from which the trunnion in FIG. 7 is manufactured;

FIG. 9 is a side elevational view, similar to the upper left portion of FIG. 1, of a portion of a fourth form of clamp formed when its trunnion is substituted in FIG. 2 or 4 for at least one of the trunnions shown in FIG. 5;

FIG. 10 is a perspective view of the trunnion in FIG. 9 removed from the clamp band; while FIG. 11 is a developed blank from which the trunnion in FIG. 10 is manufactured.

Before each clamp here illustrated is specifically described, it is to be understood that the invention here involved is not limited to the structural details, arrangement of parts, or method steps here shown or described since a clamp embodying the present invention may take various forms. It also is to be understood that the phraseology or terminology herein employed is for purposes of description and not of limitation since the scope of the present invention is denoted by the appended claim.

The drawings disclose four different clamps including a first form of clamp 30 in FIGS. 1 and 2 having a first form of trunnions, a second form of clamp 40 in FIGS. 3 and 4 having a different combination or form of trunnions, a third form of clamp 50 in FIGS. 6–8 having a third form of trunnions, and a fourth form of clamp 60 in FIGS. 9–11 having a fourth form of trunnions.

Each of these clamps 30, 40, 50 and 60 have common structure, but only portions of clamps 40, 50 and 60 are shown in the drawings. Each clamp includes a flexible band 15 formed of suitable strip material, such as strip steel; adapted to embrace an object (such as a hose, cylinder, pipe, or pipe flanges extending longitudinally along axis A) by a clamping action; and having opposite ends 15a and 15b relatively movable toward each other in a tightening direction to tighten this band on the object by reducing its circumferential length. Band 15 may be provided with strip-like tongue 17 secured at one end to band 15 in any suitable manner, such as by spot welding at 18, as shown in FIG. 1, or may be provided without this tongue, as shown in FIG. 4. If the clamp is to be used for securing together abutting pipe flanges as a V-band coupling type clamps, two arcuate V-retainer channels 20, each slightly less than 180 degrees in arcuate extent about axis A as a center, may be secured, such as by spot welding, to the inner surface of band 15 without tongue 17, as partially shown in FIGS. 3 and 4. If channels 20 are not used, band 15 may be used as a strap clamp, as shown in FIG. 1.

Each clamp has a latch and clamp tightening mechanism with similar structure. This mechanism includes a screw type clamp tightener comprising a threaded member 22 in FIG. 1 or threaded member 22' in FIG. 4, and a nut element 23. Members 22 and 22' are specifically shown respectively as bolt members 22 and 22' integrally including a threaded rod or shank 22a generally tangentially extending to the circle formed by band 15, and having respectively on one end bolt head elements 22b and 22b' as a transversely extending element integral with rod 22a. Nut element 23 screws on the opposite end of threaded rod 22a and may be a self-locking nut, if desired, so that it will not loosen under vibration. These end elements 22b and 23 each have a square or hexagonal peripheral cross section having respectively two parallel flat portions 22c or 23c laterally extending from threaded rod 22a, and having a width dimension E between these two flat portions.

Although bolts 22 and 22' and nut 23 are specifically disclosed, it will be readily apparent that each clamp will operate, and have many of its disclosed advantages, with a uniform diameter threaded rod or stud having screwed on each of its opposite ends a nut element 23 with one of these nut elements serving as a transversely extending element in place of the bolt head element. Then, the threads on rod 22a may be of opposite "hands," such as left and right hand, with one engaging each nut 23 so that as rod 22a is turned, both nuts 23 move toward each other in a clamp tightening direction.

Each clamp includes two connecting means 24 for carrying element 22b or 22b' and element 23 with band ends 15a and 15b so that one of these elements is carried by one end and the other of the elements is carried by the other end. Each connecting means 24 includes a loop 15c integrally formed and carried by the end of band 15 by having the band bent into a loop and the end of the band secured, such as by spot welding at 26, to the remainder of the band. Each loop 15c has a slot 15d for receiving threaded rod 22a. Trunnions 32 and 34 in FIGS. 1 and 2 are pivotally supported for pivotal movement about parallel axes B, one trunnion movable about each axis, and constructed to carry one of these elements. Each trunnion is pivotally supported by band 15 with loop 15c surrounding the trunnion for providing pivotal support for trunnion movement about axis B. Trunnions 32 and 34 have respectively transversely extending apertures 33 and 35 respectively adapted to be coaxially aligned on axis C to receive rod 22a with these apertures 33 and 35 aligned with slots 15d.

Each of these trunnions may take various forms, depending upon the choice of the user, such as barrel trunnion 32 in FIGS. 2, 3 and 5, T-trunnion 34 in FIGS. 1 and 2, stamped trunnion 52 in FIGS. 6 and 7, or stamped trunnion 62 in FIGS. 9 and 10.

The operation of each of these clamps should now be readily apparent. When nut element 23 is screwed onto threaded rod 22a, relative rotational movement between nut element 23 and rod 22a will move elements 23 and 22b in FIGS. 1 and 2 closer together and will move the opposite band ends 15a and 15b toward each other in the clamp tightening direction so as to decrease the circumferential size of the clamp, as shown in FIG. 1. This action transforms the hoop tension of band 15 into a large, uniform radial force exerted by the band upon the object embraced thereby. The tangentially extending bolt member 22 is held securely in place by trunnions 32 and 34 and by nut element 23 so that it cannot drop out during assembly of the clamp on the object. Each of these clamps 30, 40, 50 and 60 may be used as a band clamp, metal strap, or V-band coupling (if V-retainer channels 20 are used). Each clamp may be used to replace ordinary bolted flanges for joining engine exhaust connections, tubing in fluid systems, axially extending machine elements, sealing containers, etc.

Barrel trunnion 32 is shown in detail in FIG. 5. It has a lock means for preventing rotation of one of the aforementioned elements 22b or 23 in each clamp relative to this trunnion about axis C of apertures 33 and 35 and of rod 22a. Trunnion 32 has slot 32a transversely extending with respect to aperture 33, located at one end of this aperture, and having a width dimension D slightly greater than dimension E between element flat portions. The opposite, parallel side walls of this slot engage with the two opposite, parallel flat portions 22c or 23c of element 22b or 23 respectively to prevent turning of the element received in this slot relative to trunnion 32 about axis C during relative rotation of nut element 23 and threaded rod 22a. Hence, these opposite side walls of the slot coact with these flat portions on an element, or any other suitable lock portions projecting laterally on the element from axis C of rod 22a, to provide this lock means. The opposite side walls of slot 32a are substantially parallel and adapted to closely straddle these flat portions 22c or 23c if the difference between dimensions D and E is sufficiently great. This construction also permits removal of threaded rod 22a from trunnion 32 and removal of the element held in slot 32a for replacement purposes. Replacement is easily made when bolt 22 and nut 23 freeze together under corrosion or extreme service conditions by merely cutting threaded rod 22a knocking it out of the trunnion apertures, and replacing the removed parts with another bolt 22 and nut 23.

If desired, bolt 22 or nut 23 may be secured more firmly in trunnion 32 and prevent accidental detachment. Then, this securement may be obtained by: (1) element 22b or 23 welded in slot 32a, (2) element 22b or 23 driven in slot 32a by a force fit (dimensions D and E provide a force fit), or (3) rod 22a may have a cylindrical shoulder, of larger outside diameter than its threads, adjacent the bolt head driven by a force fit into aperture 33. Then, if replacement is desired, this secured element must be first driven out before a new element is replaced therein.

As will be apparent hereinafter, the description of the structure and mode of operation in all of the preceding paragraphs applies generically to the same named parts in FIGS. 1–11.

Barrel trunnion 32 in FIG. 5 has specific structure not found in other trunnions 52 and 62. Trunnion 32 is machined from a solid cylinder, such as steel bar stock having a round cross section; has aperture or hole 33 drilled therethrough; and has slot 32a milled therein. Trunnion 32, and its associated loop 15c have suitable axial lock means for preventing substantial relative axial movement between trunnion 32 and loop 15c. This lock means takes the form of end flanges 32c, one on each axial end of trunnion 32, straddling the associated loop 15c, as shown in FIGS. 2 and 3.

Clamp 30 in FIGS. 1 and 2 and clamp 40 in FIGS. 3 and 4 each include one or more of these barrel trunnions 32 in FIG. 5. In FIGS. 1 and 2, clamp 30 has one barrel trunnion 32; bolt head element 22b held in and straddled by slot 32a to prevent rotation of this bolt head about axis C; and T-trunnion 34, fabricated from a forged metal part machined to shape, having a sleeve 34f extending along axis C so as to locate nut element 23 out sufficiently far in FIG. 1 to permit turning this nut by a wrench. Now, when nut element 23 is turned relative to threaded rod 22a band 15 may be tightened upon the object while slot 32a holds bolt head element 22b from turning about axis C.

Clamp 40 in FIGS. 3 and 4 has two barrel trunnions 32 from FIG. 5 of identical construction. Trunnion 32 on the right in FIGS. 3 and 4 has captured within its slot 32a nut element 23. Bolt 22′ is of the Allen head variety having a hexagonal socket in bolt head element 22b′ thereof for tightening the clamp. Here, bolt head element 22b′ is a transversely extending element integral with threaded rod 22a. This bolt head element 22b′ has a cylindrical peripheral surface, which surface is either smooth or knurled, of diameter no greater than dimension E and extending coaxially with rod 22a and axis C, and has the bottom of its head bearing on the planar bottom surface of slot 32a in bearing contact. Then, as the appropriate wrench is inserted into the socket in head element 22b′ and bolt 22′ is turned about axis C, nut element 23 is held against rotation in slot 32a of right-hand trunnion 32 in FIGS. 3 and 4 to tighten the clamp on an object. Bolt head element 22b′ freely rotates about axis C because its cylindrical peripheral surface freely rotates within slot 32a and does not lock against one of the side walls of the slot, and because the bottom of bolt head element 22b′ has a smooth, planar, bearing contact with the bottom of slot 32a on the left-hand trunnion 32 in FIGS. 3 and 4.

If desired, the left-hand barrel trunnion in FIGS. 3 and 4 may have instead of slot 32a a spot face or counter bore, coaxial with trunnion aperture 33 on axis C, for rotationally receiving bolt head element 22b′.

Stamped trunnion 52 is shown in FIGS. 6–8. This trunnion 52 is tubular in form coaxial with axis B for pivotal support of this trunnion in clamp 50, partially shown in FIG. 6. Trunnion 52 has a slot 52a in the tubular wall thereof axially intermediate the ends thereof, as shown in FIG. 7, of width dimension D. This slot 52a has an element supporting surface 52b for the element 22b, 22b′ or 23 located therein with this surface 52b extending generally along a chord 52c of the circular cross section of this tube and generally perpendicular to axis C of aperture 53.

It should be readily apparent that clamp 50 in FIG. 6 may include bolt member 22, T-trunnion 34, and one of these stamped trunnions 52 instead of trunnion 32 in the manner shown in clamp 30 in FIG. 2; or may include bolt member 22′, two stamped trunnions 52 (or one stamped trunnion 52 in FIG. 7, and one stamped trunnion 62 in FIG. 10 or one machined trunnion 32 in FIG. 5) in place of the two trunnions 32 arranged in the assembly shown by clamp 40 in FIGS. 3 and 4.

Trunnion 52 and loop 15c have suitable axial lock means for preventing substantial relative axial movement between trunnion 52 and loop 15c. Trunnion 52 has two struck out bumps (or one continuous bump extending the full distance between bumps 52f) or projection parts 52f carried by trunnion 52, extending outwardly from its tubular wall, and located in and closely straddled by loop slot 15d as an interengaged projection receiving part for axially locating trunnion 52 in loop 15c along axis B.

Trunnion 52 is easily manufactured and then assembled with threaded rod 22a extending through aperture 53 so that one of the elements 22b, 22b' or 23 is located in slot 52a having width dimension D. First, a flat piece of sheet metal has stamped therefrom a sheet metal blank 52m with this blank including an H-shaped outline with aperture 53 extending through the H-cross bar 52n thereof. Blank 52m and aperture 53 is formed in a single die cutting operation. The H-shaped outline has two parallel H-legs 52p with the dimension D between the inner edges of the H-legs being only slightly greater than the dimension E between said flat portions. Second, blank 52m is wrapped into tubular form to form stamped trunnion 52. Each of the legs 52p is wrapped in tubular form until its distal ends substantially contact to form these tubular forms extending coaxially with axis B and perpendicular to axis C. Third, the opposite distal ends of each leg 52p are secured together in any suitable manner, such as by weld 54, with slot 52a located between parallel legs 52p. Fourth, threaded rod 22a is axially inserted through slot 52a and aperture 53 with the appropriate parallel flat portions on one of the elements straddled by the side walls of slot 52a, while the element bears on element supporting surface 52b, as shown in FIG. 6, to prevent relative rotation between this element and trunnion 52 about axis C.

As will be apparent hereinafter and from a consideration of the drawings, the description of the structure, mode of operation, and mode of manufacture in the preceding paragraphs relating to stamped trunnion 52 and clamp 50 also applies generically to the same named parts in FIGS. 9–11.

Clamp 60 in FIG. 9 includes one or more stamped trunnions 62. Each trunnion 62 has aperture 63, slot 62a, element supporting surface 62b, chord 62c, two struck out bumps or projection parts 62f, and welds 64. Each stamped trunnion 62 is manufactured from blank 62m, including an H-shaped outline having H-cross bar 62n and two parallel H-legs 62p.

The difference between trunnion 52 in FIG. 7 and trunnion 62 in FIG. 10 should be readily apparent from the drawings. In trunnion 52, element supporting surface 52b includes two lugs 52r in FIG. 7 lying in coplanar relationship to form the bottom of slot 52a. Blank 52m in FIG. 8 includes, in addition to the H-shaped outline, the two lugs 52r integrally formed with the rest of blank 52m and extending out of the opposite parallel side of the H-cross bar 52n. When legs 52p are wrapped into tubular form, lugs 52r can be bent inwardly into their coplanar relationship shown in FIG. 7 so as to be integrally formed with the tube or outer cylindrical wall of trunnion 52 in FIG. 7. In contrast, trunnion 62 in FIG. 10 has its element supporting surface 62b formed by only parallel extending tubular wall edges 62s located at opposite ends of chord 62c.

Now, it should be apparent that any of the trunnions 32, 34, 52 or 62 may be secured in any desired manner in band loops 15c to form a complete clamp. Clamps 30, 40, 50 and 60 have been described as some of the clamps adapted to be formed with this variety of trunnions.

Various changes in details and arrangement of parts can be made by one skilled in the art without departing from either the spirit of this invention or the scope of the appended claim.

What is claimed is:

A clamp, comprising a flexible band for embracing an object and having ends relatively movable in a tightening direction, a member including a threaded rod carrying a transversely extending element on one end, a nut element adapted to screw on the other end of said threaded rod, a first connecting means for carrying said first mentioned element with one of said ends, and a second connecting means for carrying said nut element with the other of said ends so that upon nut element engagement with said threaded rod relative rotational movement between said rod and nut element will move said elements and ends in said tightening direction, one of said connecting means including a trunnion pivotally supported by said band for carrying one of said elements and having a transversely extending aperture therethrough to receive said rod, said trunnion having lock means for preventing rotation of said one element relative to said trunnion about the axis of said rod during relative rotational movement between said rod and nut element for moving said ends in said tightening direction, said trunnion being tubular in form coaxial with the axis of pivotal support thereof, said trunnion having a slot in the tubular wall thereof intermediate the ends thereof, the walls of said slot having an element supporting surface for said same element extending generally along a cord of said tube and generally perpendicular to the axis of said aperture, said element supporting surface including two lugs integrally formed with the tube wall and extending inwardly in coplanar relationship to form the bottom of said slot.

References Cited in the file of this patent

UNITED STATES PATENTS

| | | |
|---|---|---|
| 1,596,944 | Philbrook | Aug. 24, 1926 |
| 1,641,559 | Thompson | Sept. 6, 1927 |
| 2,120,462 | Ferguson | June 14, 1938 |
| 2,127,456 | Adams | Aug. 16, 1938 |
| 2,339,759 | Bidwell | Jan. 25, 1944 |
| 2,341,828 | Tetzlaff | Feb. 15, 1944 |
| 2,618,050 | Thomas | Nov. 18, 1952 |
| 2,651,094 | Dodge | Sept. 8, 1953 |
| 2,651,095 | Kates | Sept. 8, 1953 |
| 2,756,484 | Booth | July 31, 1956 |
| 2,787,039 | Krasberg | Apr. 2, 1957 |
| 2,806,276 | Cooper | Sept. 17, 1957 |
| 2,915,800 | Graef et al. | Dec. 8, 1959 |
| 2,920,672 | Bronson | Jan. 12, 1960 |

FOREIGN PATENTS

| | | |
|---|---|---|
| 573,695 | Great Britain | Dec. 3, 1945 |